(12) United States Patent
Singer et al.

(10) Patent No.: US 7,783,556 B1
(45) Date of Patent: Aug. 24, 2010

(54) SYSTEM AND METHOD FOR DISPLAYING ORDER INFORMATION IN RELATION TO A DERIVATIVE OF PRICE

(75) Inventors: Scott F. Singer, Lake Bluff, IL (US); Michael J. Burns, Chicago, IL (US); Fred Monroe, Silver Springs, MD (US)

(73) Assignee: Trading Technologies International, Inc., Chicago, IL (US)

( * ) Notice: Subject to any disclaimer, the term of this patent is extended or adjusted under 35 U.S.C. 154(b) by 1131 days.

(21) Appl. No.: 10/800,295

(22) Filed: Mar. 12, 2004

(51) Int. Cl.
*G06Q 40/00* (2006.01)

(52) U.S. Cl. ........................................... 705/37

(58) Field of Classification Search .............. 705/39–41
See application file for complete search history.

(56) References Cited

U.S. PATENT DOCUMENTS

| | | | | |
|---|---|---|---|---|
| 4,885,685 A | * | 12/1989 | Wolfberg et al. | 705/14 |
| 6,317,728 B1 | * | 11/2001 | Kane | 705/36 R |
| 6,772,132 B1 | | 8/2004 | Kemp, II | |
| 6,850,555 B1 | * | 2/2005 | Barclay | 375/141 |
| 6,938,011 B1 | | 8/2005 | Kemp, II | |
| 7,127,424 B2 | | 10/2006 | Kemp, II | |
| 7,212,999 B2 | | 5/2007 | Friesen et al. | |
| 2002/0099644 A1 | * | 7/2002 | Kemp et al. | 705/37 |
| 2003/0004852 A1 | * | 1/2003 | Burns | 705/37 |
| 2003/0004853 A1 | | 1/2003 | Ram et al. | |

OTHER PUBLICATIONS

Star Research Inc, "Profit Loss vs Price," Apr. 19, 2001, pp. 1-24.*
QBL Software, "Radar Screen," Apr. 13, 2000, pp. 1-4.*
Co-Pending U.S. Appl. No. 11/415,884, filed May 2, 2006.

* cited by examiner

*Primary Examiner*—Thu-Thao Havan
*Assistant Examiner*—Chia-Yi Liu
(74) *Attorney, Agent, or Firm*—McDonnell Boehnen Hulbert & Berghoff LLP (57) ABSTRACT

Market data, such as order information, is displayed in relation to a derivative of price. A derivative of price refers to anything that bears some relationship to price, examples of which, include net change, yield, profit and loss, volatility, momentum indicators, and more. According to various aspects of the preferred embodiments, market data is received from one or more electronic exchanges and a value axis is generated based on a user's preferences. Then, market data can be displayed in relation to the value axis to provide a user interface that allows a trader to view the market from a more desirable perspective.

22 Claims, 10 Drawing Sheets

Price Derivative
☐ Price
☒ Net Change
☐ Previous Settlement
  [10 ▶] Days    [Price ▶] Value
  [0 ▶] Hour
  [0 ▶] Minutes
  [0 ▶] Seconds
☐ P/L
  [▶] Days
  [▶] Hours        ☐ Yield
  [▶] Minutes
☐ Volitility    [Browse Formulas]
☐ Momentum     [Formula Entry]

SYSTEM AND METHOD FOR DISPLAYING ORDER INFORMATION IN RELATION TO A DERIVATIVE OF PRICE

FIELD OF INVENTION

The present invention relates to electronic trading. More specifically, the present invention relates to displaying market information on a screen.

BACKGROUND

An electronic exchange provides an automatic matching process between buyers and sellers, also referred to herein as traders. In particular, traders connect to an electronic exchange over a communication link. If necessary, a gateway is sometimes used to connect the trader with the electronic exchange. Once a trader is connected, the electronic exchange can broadcast its data feed to the traders over the communication link. Subsequently, the traders receive the data feed, in one form or another, and their computers process the information. Traders may respond by sending orders to buy or sell the tradeable object. When the electronic exchange receives an order, it may check the limits of the order, for example price and quantity, and prioritize the order. When buy and sell orders match, a trade occurs and information relating to the trade is relayed back to the traders' computers.

The kinds of information that are present in an electronic exchange's data feed are relatively dependent on the exchange itself. However, most electronic exchanges provide the same key pieces of information. For instance, they typically provide the best prices. This might include the best bid price, which represents the highest price that someone is willing to pay for the tradeable object, and the best offer price, which represents the lowest price that someone is willing to sell the tradeable object. A data feed might also include one or more levels of the next best prices such as the next highest bid price(s) or the next lowest ask price(s). Along with price information, an electronic exchange will likely provide the bid and offer quantities available at those prices. More advanced electronic exchanges may even provide things like the last traded price ("LTP"), the last traded quantity ("LTQ"), the previous day's settlement price, the open price, the close price and other information.

The data feed's content can be displayed to a trader using a variety of different formats, any of which would be known to one of ordinary skill in the art. To provide the reader with a general background, two examples are provided directly below, with the understanding that many different formats and variations of the example screens shown in FIG. 1 and FIG. 2 exist and could also be used.

Figure 1:
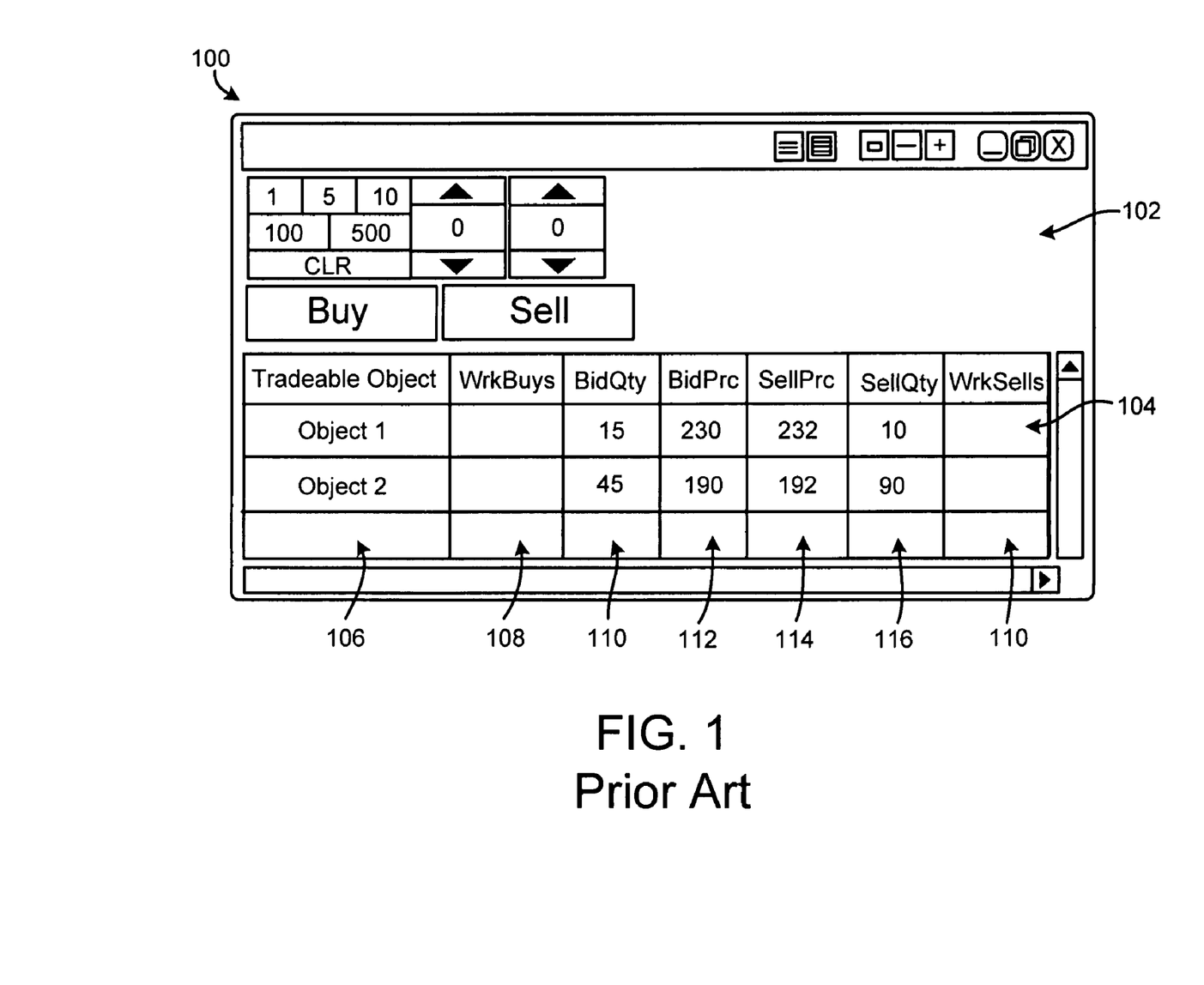
FIG. 1 illustrates one example format used to convey market information received from an electronic exchange to a trader.

In one example, FIG. 1 illustrates a typical display 100 used in electronic trading. A trading screen similar to that shown in FIG. 1 is commercially available, as the Market window in the X_Trader® product offered by Trading Technologies International, Inc. of Chicago, Ill. In general, display 100 has an order entry section 102 and a market grid section 104. The order entry section 102 may have pre-set fields, properties, and buttons that can help someone trade quickly and efficiently. The market grid section 104 displays tradeable object information such as the tradeable objects name 106, number of working buy orders 108, bid quantities 110, bid prices 112, sell prices 114, sell quantities 116 and working sell orders 110. For instance, "object 1" is a tradeable object that has an inside market with a best bid price of "230" and a best offer price of "232." The quantity available at the inside market is "15" at "230" and "10" at "232." In another instance, "object 2" is another tradeable object that has an inside market with a best bid price of "190" and a best offer price of "192." The quantity available at the inside market is "45" at "190" and "90" at "192."

Figure 2:
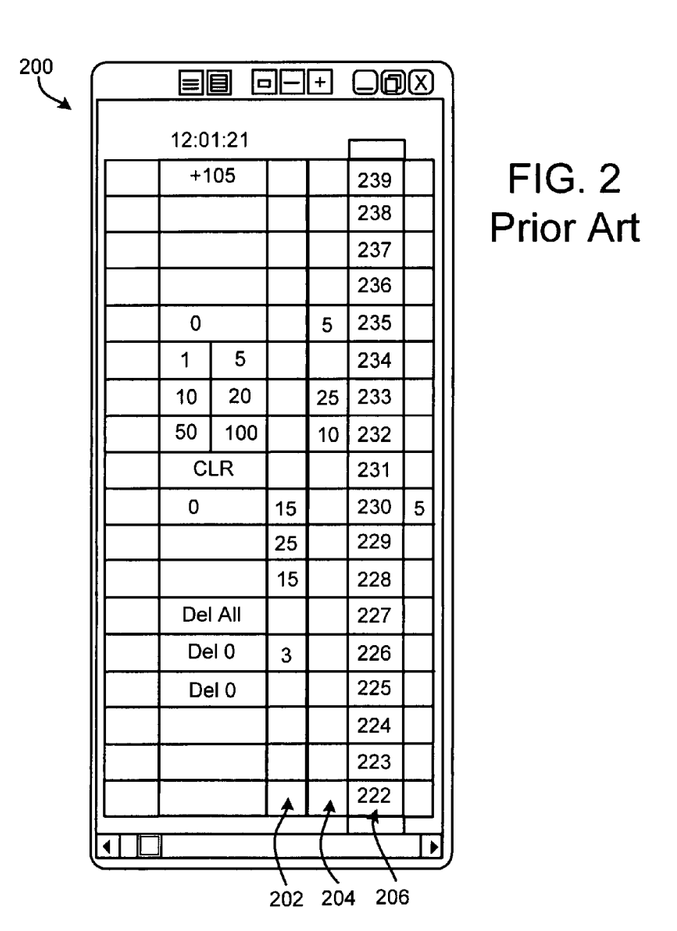
FIG. 2 illustrates a second example format used to convey market information received from an electronic exchange to a trader along an axis.

In another example, FIG. 2 illustrates an evolved and more intuitive trading screen 200. A trading screen similar to that shown in FIG. 2 is also commercially available, as MD Trader™, from Trading Technologies International, Inc. of Chicago, Ill. Trading screen 200 displays the same type of information as trading screen 100 in FIG. 1, except that it displays, among other things, bids 202 and offers 204 in association with price values along axis 206. Thus, a trader may view the market as it moves relative to price values on axis 206. Moreover, traders may enter orders quickly through trading screen 200 by simply clicking, with a mouse or some other input device, on specific areas on the screen associated with the price values.

In addition to viewing traditional-style trading screens, traders are often interested in analyzing other pieces of highly relevant information that are not normally provided in an electronic exchange's data feed nor displayed by a trading screen. For instance, they might make quick mental calculations, use charting software, or look to other sources to provide additional insight beyond what is normally provided by an exchange or a typical trading screen. Some even trade directly off this information. Regardless of what source or sources a trader might use, it may be too difficult for the trader to quickly assimilate this highly relevant information from diverse and often unrelated sources or even effectively process all of the information to make informed trades. In doing so, the trader must attempt to determine various trends in the buying or selling of the tradeable object to favorably characterize the market.

In the following detailed description, a system and method for displaying, on a trading screen, order information in relation to a derivative of price, and in particular, for displaying the derivative of price along an axis, are described. These tools provide advantages, as described below, to a trader in an electronic trading environment.

BRIEF DESCRIPTION OF THE DRAWINGS

Many aspects of the preferred embodiments may be better understood with reference to the following drawings. The components in the drawings are not necessarily to scale, emphasis instead being placed upon illustrating example embodiments.

DETAILED DESCRIPTION

I. Overview

The system and method of the present invention are appropriate for use in any electronic trading screen, and work particularly well with a trading screen similar to that shown in FIG. 2, which displays market data in association with a price scale or axis. A trading screen like that shown in FIG. 2 is described in U.S. patent application Ser. No. 09/590,692, filed on Jun. 9, 2000, and entitled, "Click Based Trading With Intuitive Grid Display of Market Depth," the contents of which are incorporated herein by reference. The system and method may also work with a trading screen like that shown in FIG. 1, which is described in U.S. patent application Ser. No. 09/589,751, filed on Jun. 9, 2000, and entitled, "Click Based Trading with Market Depth Display," the contents of which are incorporated herein by reference.

In the description that follows, in the interest of clarity, aspects of the preferred embodiments will focus primarily on generating values that are derivatives of price and then displaying these values along an axis on a screen. Thereon, market information is displayed in relation to the value axis. Though, it is understood that the system and method of the present invention may be applied to any trading screen and are not limited to those with use of an axis. It is further understood that the generated values do not actually need to be displayed to a trader so long as market information is displayed in relation to the derivative of price values on the value axis.

As used herein, a derivative of price is anything that has some dependence on or relationship to price. For instance, a derivative of price (or "price derivative") might result from a formula or other logical relation. There are many different possible price derivatives and they are readily apparent to one of ordinary skill in the art. Accordingly, an example embodiment using net change as the derivative of price is primarily described with the understanding that there are numerous other price derivative types. For further illustration, however, some additional examples are also included.

Other systems, methods, features, and advantages of the present invention will be or become apparent to one with skill in the art upon examination of the following drawings and description. It is intended that all such additional systems, methods, features, and advantages be within the scope of the present invention, and be protected by the accompanying claims.

II. Example Trading System

The system and method of the preferred embodiments are appropriate for use in any electronic trading environment. The example electronic trading system, comprising various elements, is described with the understanding that there are numerous equivalent elements and systems, all of which will be apparent to one of ordinary skill in the art.

Figure 3:
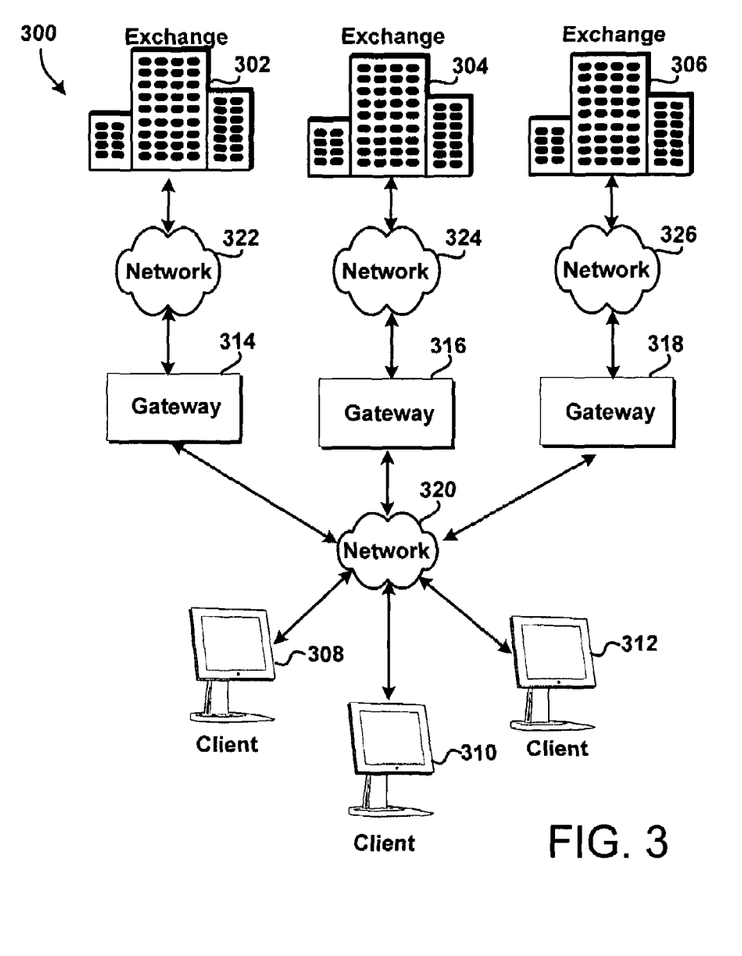
FIG. 3 illustrates an overview of an example system configuration, in accordance with the preferred embodiments, used to relay market information to a variety of trading terminals.

FIG. 3 is a block diagram that illustrates an example electronic trading system 300. The electronic trading system 300 includes one or more electronic exchanges generally indicated as 302, 304, 306 and one or more client devices generally indicated as 308, 310, 312. Intermediate devices such as gateways 314, 316, 318, routers (not shown), and other such types of network devices may be used to connect network 320 to networks 322, 324, 326 so that client devices 308, 310, 312 and exchanges 302, 304, 306 can communicate.

As indicated above, the preferred embodiments are not limited to any particular trading system configuration. For instance, networks 322, 324, 326 could represent the same network, network 320 could represent the same network as networks 322, 324, 326, or client devices 308, 310, 312 could connect directly to gateways 314, 316, 318. In addition, it is understood that the preferred embodiments may be implemented with systems that have only one electronic exchange (e.g., any of electronic exchanges 302, 304, 306) that lists one or more tradeable objects.

A. Electronic Exchange

In one embodiment, electronic exchanges 302, 304, 306 represent electronic trading platforms that preferably support electronic transactions of various kinds of tradeable objects. Examples of more sophisticated electronic trading platforms include the London International Financial Futures and Options Exchange (LIFFE), the Chicago Board of Trade (CBOT), the Chicago Mercantile Exchange (CME), the Exchange Electronic Trading ("Xetra," a German stock exchange), and the European Exchange ("Eurex").

In another embodiment, electronic exchanges 302, 304, 306 might refer to other facilities, which include more basic systems that automatically match incoming orders. According to this embodiment, for instance, an electronic exchange 302, 304, 306 might simply refer to an online trading place where sports fans go to buy or sell seats for an event.

Each of the electronic exchanges 302, 304, 306 may host one or more computer-based electronic markets. Traders may connect to the one or more electronic markets to trade tradeable objects. As used herein, the term "tradeable objects," refers simply to anything that can be traded with a quantity and/or price. It includes, but is not limited to, all types of tradeable objects such events, goods and financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable object, such as a class of tradeable objects.

An electronic market can implement any of the numerous types of order execution algorithms; sometimes the type of algorithm depends on the tradeable object being traded. By way of illustration only, some example order execution algorithms include price/time priority (also referred to as first-in-first-out or "FIFO") and pro rata-style algorithms. The FIFO algorithm, for instance, attempts to give priority to the first person to place an order. The pro rata algorithm, for instance, splits all (or most) orders for the same price at a particular point in time. The system and method of the present invention are not limited to any particular type of order execution algorithm.

It is further understood that an electronic market might include other software and/or hardware components to perform other tasks beyond matching orders or part of orders. These software and/or hardware components may be local or remote to the physical location of an electronic exchange. In other words, the components can be operated at the electronic exchange or at locations outside of the electronic exchange such as points of access. Points of access may include gateways or other fast computing devices that are nearby the electronic exchange and have access to other points of access near other electronic exchanges.

B. Gateway

In one embodiment, gateways 314, 316, 318 function as portals to a particular electronic exchange. Gateways 314, 316, 318 may include any computing device such as a mainframe, super minicomputer, minicomputer, workstation, or personal computer that connect network 320 to networks 322, 324, 326 so that market information may be successfully passed between client devices 308, 310, 312 and exchanges 302, 304, 306.

According to one aspect, gateways 314, 316, 318 preferably receive market data from exchanges 302, 304, 306 and convert it to a form compatible with the protocols used by client devices 308, 310, 312 using conversion techniques known in the art. Also, as known by those skilled in the art, gateways 314, 316, 318 may have one or more servers to support the data feeds, such as a price server for processing price information, an order server for processing order information, and a fill server for processing fill information. A trader at one of client devices 308, 310, 312 can preferably subscribe to price information, order information, and fill information for a particular electronic market hosted at exchanges 302, 304, 306. According to another aspect, gateways 314, 316, 318 preferably receive transaction information, such as orders, order changes, queries, etc. from client devices 308, 310, 312 and forward that information to corresponding exchanges 302, 304, 306.

In another embodiment, client devices 308, 310, 312 might connect to electronic exchanges 302, 304, 306 without the need for protocol translation. For instance, a client device might have computer software that recognizes a particular exchange's protocol, and therefore, may have a direct connection to the electronic exchange.

It is further understood that gateways or similar types of computer-based devices may be used as points of access. Accordingly, client devices 308, 310, 312 may access an electronic exchange through a gateway, especially if the gateway(s) is used as a point of access in a network and/or at an electronic exchange.

C. Client Device

In one embodiment, client devices 308, 310, 312 function as an interface to trade at one or more electronic exchanges 302, 304, 306. Examples of client devices include a personal computer, laptop computer, hand-held computer, and so forth. Client devices 308, 310, 312, according to one aspect of the preferred embodiments, include at least a display, processor and memory. The processor and memory, which are both well-known computer components, are not shown in the Figure for sake of clarity.

It is understood that a display includes any visual output device of a client device. For sake of illustration to the reader only, examples include a CRT-based display, LCD-based display, a gas plasma-based display, or any other type of display device. For instance, the display device might be physically set on a desk top for a user to view, projected on a wall by a projector, or head mounted in special goggles.

It is further understood that a processor includes any device that, among other things, interprets and executes instructions. In other words, the processor functions as the "brains" of the computer device. Processor may also encompass any components that make up the computers main console to perform the functions described herein.

It is further understood that memory includes a device where information can be stored (temporarily or otherwise) on any computer readable medium and retrieved. The term computer readable medium, as used herein, refers to any medium that participates in providing instructions to processor for execution. Such a medium may take many forms, including but not limited to, non-volatile media, volatile media, and transmission media. Non-volatile media includes, for example, optical or magnetic disks, such as storage device. Volatile media includes dynamic memory, such as main memory or RAM (sometimes referred to as "random access memory"). Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

In one embodiment, depending on what tradeable objects are being traded, each of client devices 308, 310, 312 receive market information from one or more electronic markets hosted at any of electronic exchanges 302, 304, 306. Accordingly, market information is displayed to the trader(s) in a trading screen, in accordance with the preferred embodiments, on a visual output device or display device. A trader may also receive news to aid him in analyzing information received from the exchange.

Upon viewing the market information or a portion thereof, a trader may wish to send orders to an exchange, cancel orders in a market, change orders in a market, query an exchange, and so on. To do so, the trader may input various commands or signals into the client device 304, for example, by using one or more conventional means for inputting information such as typing into a keyboard, inputting commands through a mouse, or inputting commands or signals through some other input device.

Upon receiving one or more commands or signals, client devices 308, 310, 312 preferably generate transaction information. In addition to or in place of manual entry, a trader might use automated trading software that automatically or semi-automatically generates transaction information. Of course, there are many different types of messages and/or order types that can be submitted to an electronic exchange, all of which may be considered various types of transaction information. Once generated, for instance, transaction information is sent from client device 308 to exchange 302 over network(s) 320 and 322.

III. System Function and Operation

As will be appreciated by one of ordinary skill in the art, various aspects of the preferred embodiments may be operated in an entirely software embodiment, in an entirely hardware embodiment, or in a combination thereof. In the interest of clarity, the preferred embodiments are described in a software embodiment based on a C or C++ language, or any other suitable programming language, which is executed on a computer device. As such, the preferred embodiments take the form of a computer program product that is stored on a computer readable medium and is executed by a suitable instruction execution system or processor in the computer device. Examples of computer readable medium were provided above.

It is understood that the description contained herein is considered as illustrative only of the various aspects of the preferred embodiments. Further, since numerous modifications and changes will readily occur to those skilled in the art, it is not desired to limit the present invention to the construction and operation shown and described, and accordingly, all suitable modifications and equivalents may be resorted to.

In one embodiment, the system and method of the preferred embodiments may be operated at a client device. For instance, referring to FIG. 3, one of, some of, or all of client devices 308, 310, 312 may run program software to implement the various functions described herein. As shown in FIG. 3, each client device 308, 310, 312 is electronically linked to each of electronic exchanges 302, 304, 306 through gateways 314, 316, 318 to receive a data feed. Preferably, each client device 308, 310, 312 may receive data feeds from multiple electronic exchanges. A client device may use the data feed to generate derivative of price values.

In another embodiment, the system and method of the preferred embodiments may be operated at other computing devices besides client devices 308, 310, 312. For instance, referring again to FIG. 3, any of gateways 314, 316, 318 may run program software to implement the functions described herein. Each gateway 314, 316, 318 is electronically linked to electronic exchanges 302, 304, 306 to receive one or more data feeds. A gateway may generate derivative of price values for display and disseminate the values across one or more networks to client devices 308, 310, 312. In addition, gateways (not shown in FIG. 3) might be used to electronically interconnect communication between exchanges 302, 304, 306. Other types of computer devices like gateways may be used to run the program software to implement aspects of the preferred embodiments.

In yet another embodiment, the system and method of the preferred embodiments may be operated by other computing devices at an electronic exchange. According to this embodiment, an electronic exchange could provide one or more various data feeds that include market information corresponding to a price derivative. For instance, referring again to FIG. 3, any of electronic exchanges 302, 304, 306 may run program software to implement the functions described herein. One or more data feeds with derivative of price values may be disseminated from an electronic exchange to gateways 314, 316, 318 and/or client devices 308, 310, 312.

Figure 4:
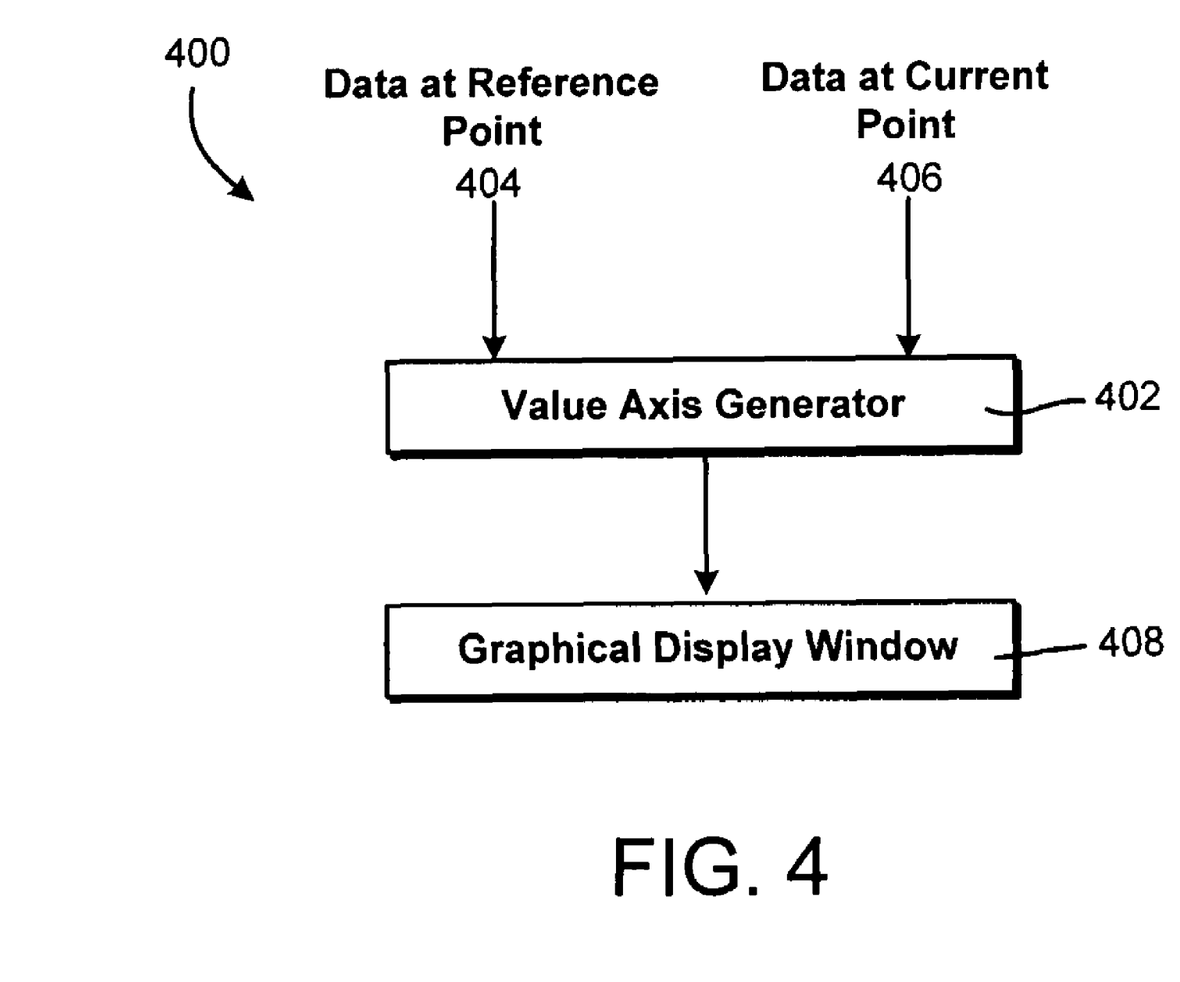
FIG. 4 illustrates a flow diagram of an example process for generating a derivative of price axis and displaying order information in association with derivative of price values on the axis.

FIG. 4 shows a flow diagram for illustrating an example method of operation, and more specifically shows the functionality and operation of a possible implementation of the preferred embodiments. In this regard, each block may represent a module, segment, or portion of code, which includes one or more executable instructions for implementing specific logical functions or steps in the process. Alternate implementations are included within the scope of the preferred embodiment of the present invention in which functions may be executed out of order from that shown or discussed, including substantially concurrently or in reverse order, depending on the functionality involved, as would be understood by those reasonable skilled in the art of the present invention.

In the interest of clarity, net change will be used to describe the flow diagram of FIG. 4, with the understanding that there are numerous other price derivatives. As used herein, net change represents a difference in value(s) between two points in time. Examples of other price derivatives include yield, profit/loss (P&L), volatility and momentum, just to name a few, and are described later in the application. It is understood that net change may also include the net change of price, yield, P&L, volatility, momentum, or a change in any other measurement.

Turning to FIG. 4, various signals may be input into value axis generator 402. The various signals may depend on the actual price derivative. With respect to net change, reference point 404 represents one or more values at an earlier point in time. Current point 406 represents one or more values at the current time (or some other designated time that occurs after reference point 404). Value axis generator 402 receives the inputs at each point in time and computes the price derivative values based on some predefined relationship or formula, which in this instance, is the change in values at reference point 404 and current point 406. Then, value axis generator 402 generates an axis of values, which may be subsequently used and updated in graphical display window 408. The axis may also be displayed. An example relationship for net change is provided to the reader in the examples section of this application.

It is understood that if the price derivative is displayed, the price derivative values may be represented in numerical form and/or graphical form. If they are represented in graphical form, then shapes, colors, or any other graphic may be used in addition to the number values or in place of the number values to represent the various price derivative values. For instance, if profit and loss (P&L) was the price derivative, then the color green might be used to represent a positive P&L whereas the color red might be used to represent a negative P&L.

In one aspect, a data feed is received from an electronic exchange as described above. Information pertaining to the value type is parsed out of the data feed by value axis generator 402 and held. The information might be held in buffer storage or on some other computer readable medium. The length of time that the information is held most likely depends on the time difference between reference point 404 and current point 406. For instance, if the time difference is one-hour, then the relevant information is preferably held for approximately one-hour.

In another aspect, a data feed is received from another software application. According to this aspect, information from another software application such as a computer-based spreadsheet or an automated trading tool, for instance, may generate values based on various pieces of market information received from an exchange and some user defined algorithm. Accordingly, the information received from the software application pertaining to the value type may be parsed and held, similarly to the way information is received from an electronic exchange.

Figure 5:
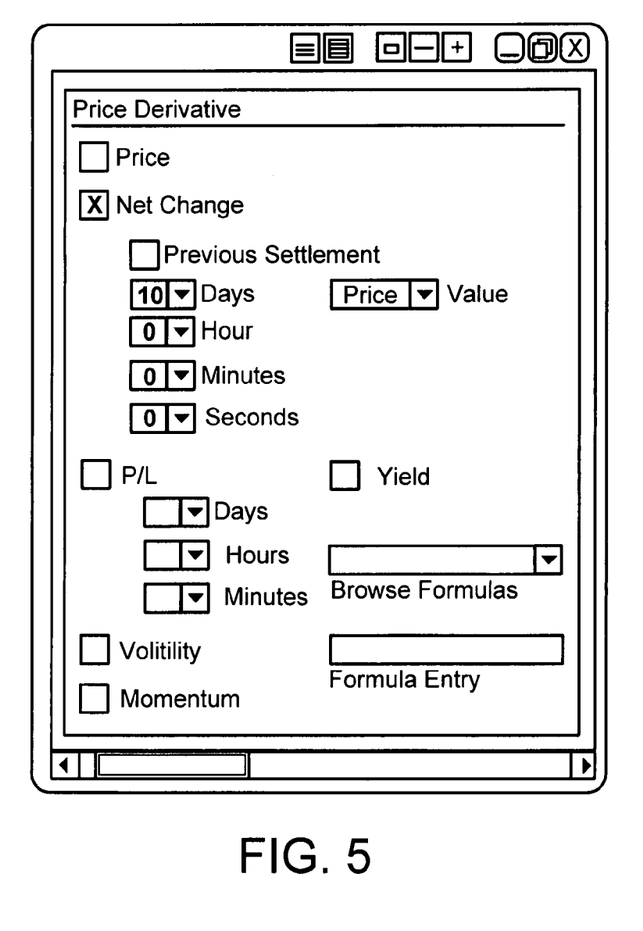
FIG. 5 illustrates an example graphical user interface that can be used to select price derivative types for use in generating price derivative values.

In one embodiment, the trader can set parameters that are used in determining the price derivative through a graphical user interface. FIG. 5 shows an example embodiment of a graphical user interface. Graphical user interface 500 ("GUI") is a visual environment that preferably represents options with graphical images, such as icons, menus, and dialog boxes on a screen. The user may select and activate these options by pointing and clicking with a mouse, selecting them with a keyboard, or by setting them with some other input device. It is also possible to set such parameters through something other than a graphical user interface, such as through command-line entry, which is not shown in FIG. 5.

As shown in FIG. 5, GUI 500 allows a user to select the price derivative of choice. In addition to, or in place of, displaying price, which is a more conventional display option shown in FIGS. 1 and 2, the preferred embodiments allow the user to select price derivatives including, but not limited to, net change, yield, profit/loss (P/L), volatility, and momentum. Preferably, the price derivative can be based on any user-defined formula. For instance, GUI 500 might enable a user to define a particular formula (e.g., shown in FIG. 5 at "Formula Entry" by providing a user with an area for entering an equation and/or linking an equation from a third party software program), or GUI 500 might allow a user to search through a selection of one or more formulas (e.g., shown in FIG. 5 at "Browse Formulas" by browsing for predefined equations).

According to one aspect, if a user selects net change (shown as a mark "X" in a check box next to the net change option in FIG. 5), then GUI 500 allows a user to enter more detail related to net change. For instance, GUI 500 allows for input of a reference point 404 such as the previous settlement price, or a time differential starting at a particular day, hour, minute, and second. For instance, as shown in FIG. 5, "10" days was chosen as the reference point 404, which means that the system will preferably calculate the net change between the current time (or some other designated time, if allowed to do so) and "10" days previous to the current time.

According to another aspect, an option in the form of an icon or button may be provided on the trading screen that allows a trader to simply select it thereby setting the reference point 404 to the time of selection. In other words, a trader may preferably set the reference point 404 right on the trading screen, and on the fly if so desired, instead of or in addition to, setting it through GUI 500. Then, the price derivative values may change on the fly according to the time of selection. For instance, while a trader is trading a particular tradeable object, he or she may select, preferably at any time, an icon or button that causes value axis generator 402 to immediately recalculate the net change values starting from the time of selection to the present time. This feature may also apply to any other price derivative. Notice that an icon/button labeled "Update" is shown in FIGS. 6-10 to implement this feature. In other words, the "Update" icon can be selected through a single action of a user input device to recalculate the price derivative values at that time. Of course, the icon or button may be placed anywhere on the screen.

According to yet another aspect, a programmed event may cause value axis generator 402 to recalculate the price derivative values. For now, let us assume that net change is the price derivative and this feature is programmed to recalculate when a user's own order is filled. According to this example assumption, if the trader's order fills, value axis generator 402 would calculate net change values from the time the order filled to the current time. Of course, any event may be preferably programmed so that when the event occurs, value axis generator 402 responds by generating or updating values on the value axis. This feature may also apply to any other price derivative.

In the preferred embodiments, once a price derivative is chosen, the price derivative value or values, which are generated by value axis generator 402, may be used and/or displayed in any trading screen regardless of whether the trading screen utilizes an axis. In particular, the price derivatives may be used in place of and/or displayed where prices have normally been used and/or displayed in conventional systems. Thus, one of ordinary skill in the art will recognize that the preferred embodiments may be beneficially utilized by any particular trading screen.

IV. Net Change Examples

A. Generating and Displaying Data in Relation to a Price Derivative

According to one example, assume that net change has been selected as the price derivative and the reference point was yesterday's settlement price in units of ticks at "125," where a tick is the minimum change in a price value that is set by the exchange for each tradeable object. The last traded price ("LTP") is currently at a price of "230," shown in FIG. 6 by the "5" placed in the last traded quantity indicator column 602. Using the following relationship directly below, value axis generator 402 computes a net change of +105=230−125.

Figure 6:
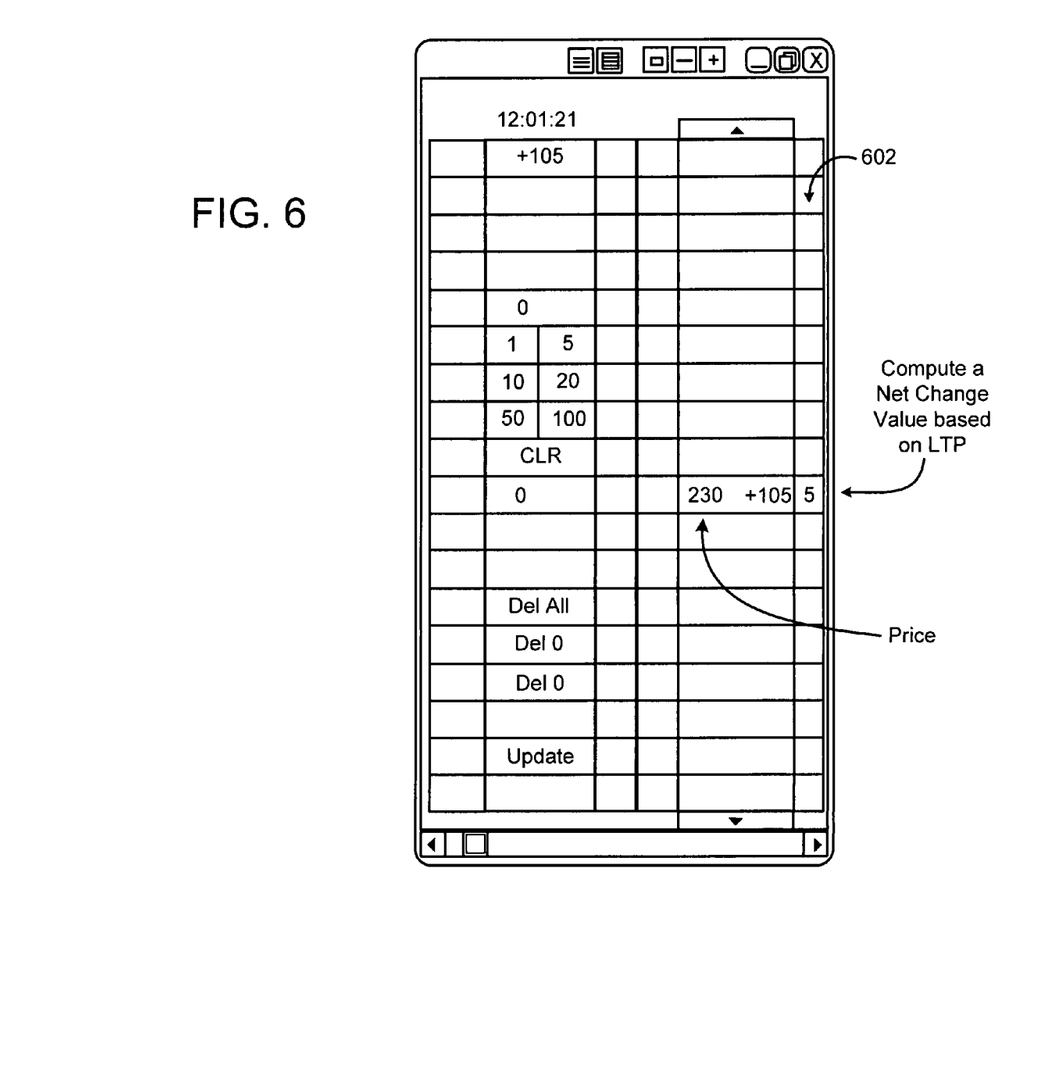
FIGS. 6-9 illustrate an example screen in accordance with an aspect of the preferred embodiments.

Net change=(Value(s) at Current Point)−(Value(s) at Reference Point)

Figure 7:
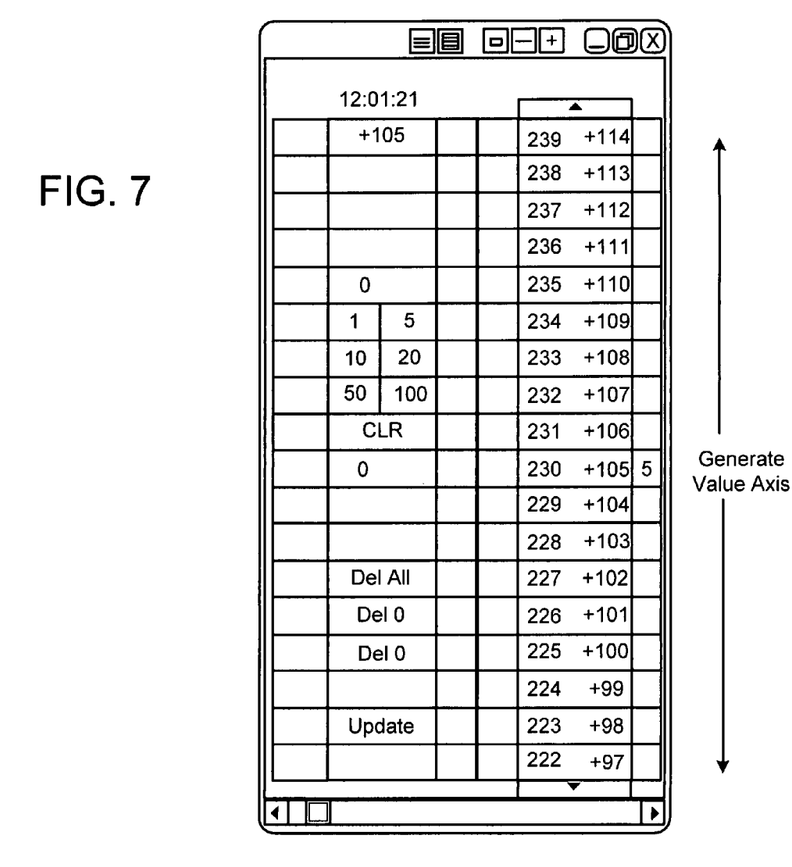
Figure 8:
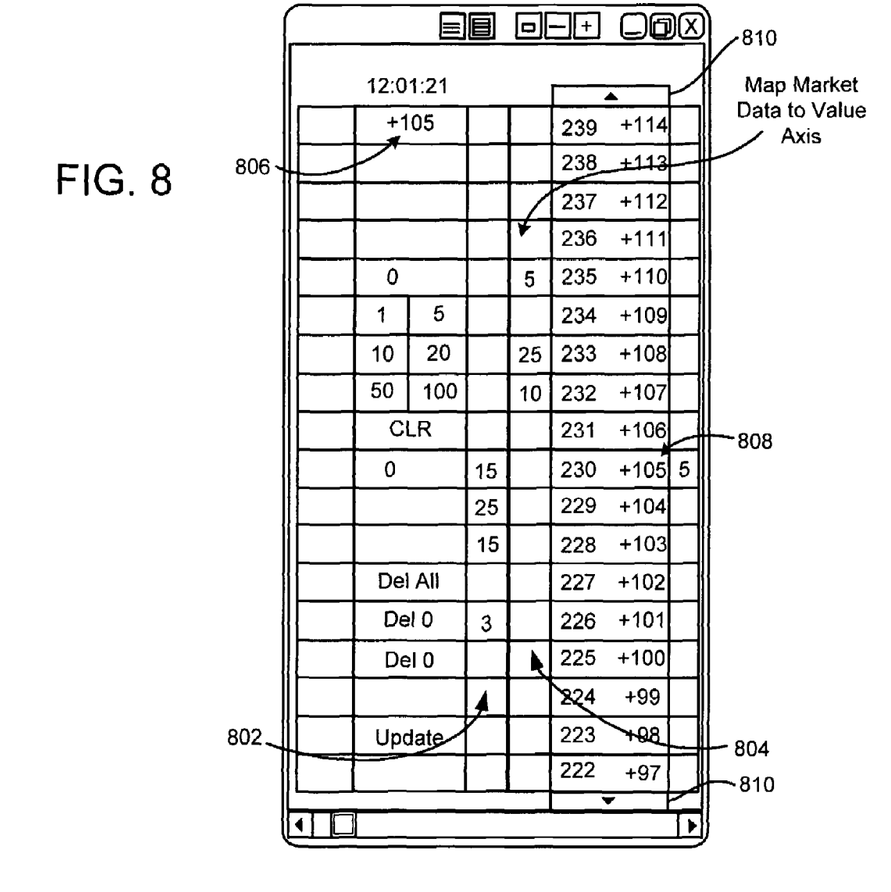

By way of illustration, FIG. 6 shows an example screen that displays the computed net change value of "+105." Preferably, the net change value is placed approximately in the center of the display so that market data, such as bid and offer quantities, may be mapped and properly viewed by the trader. It is understood that FIGS. 6, 7, and 8 show various steps for describing one example process of generating the value axis to the reader of this application. As a commercially viable product, value axis generator 402 preferably generates the axis and maps the market data in a simultaneous, or near simultaneous, manner so that the market data can be conveyed to the trader in real-time, without disruption.

Now, value axis generator 402 can compute other net change values that correspond to price levels above and below the current last traded price. By doing this, the current bid and ask quantities may be displayed approximately near the center of the display. We end up with a value axis that includes values ranging from "+97" to "+114," shown in FIG. 7. These values may be generated in any particular way. One example method includes moving up/down to various price levels in one-price tick-increments and calculating the net change value based on that particular price level and doing this for as many price levels as necessary. Another example method includes determining the minimum net change, which most likely corresponds directly to the minimum price tick size, and adding/subtracting the minimum net change to various levels of net change on the value axis (e.g., FIG. 7 shows a minimum net change of "1," therefore according to this example, a value of "1" can be added/subtracted from "+105" to calculate the net change values one level above/below "+105," which can be repeated for as many levels as needed).

FIG. 8 shows an example screen that displays the generated value axis in addition to market data. As shown, market data, such as the bid and offer quantities, are mapped to the price derivative values. Currently, the last traded price is "+105" ticks above yesterday's settlement price. This can now be seen by referring to the net change box 806, which displays the current net change value, or by viewing the last traded quantity in direct relation to the net change at 808 along the value axis. In addition, one can view the current best bid price is "+105" ticks above yesterday's settlement price, the current best offer price is "+107" ticks above yesterday's settlement price, and so on. As such, a trader can quickly and effectively determine the net change between the current state of the market and the state of the market as it was yesterday at closing, or at whatever reference point chosen. As new market data is received, value axis generator 402 preferably updates the screen to reflect the new information.

There are alternative ways to generate the value axis. In the above example, the current last traded price ("LTP") was used to begin the generation process. Then, the remaining part of the viewable axis was completed so that market data could be mapped and easily seen by a trader on the screen. However, other items may be used instead of LTP. As such, the value axis generator 402 could be programmed to start at the best bid price, the best offer price, or some other item of interest. For instance, if the best offer price is used, then value axis generator 402 computes a net change of +107=232±125. Then, value axis generator 402 can compute other net change values that correspond to price levels above and below the current best offer price.

It is understood that a trader can scroll along the value axis (e.g., by pressing the up or down arrows 810, as shown in FIG. 8) to view other net change values and/or other pieces of market information, such as working orders, relative to the value axis. When this happens, value axis generator 402 preferably completes the visible portion of the axis using the already generated values as a starting point. For instance, referring to FIG. 8, if the trader scrolls up and beyond the net change of "+114," then value axis generator 402 can start at "+114" and graphically fill in the visible locations (e.g., "+115," "+116," . . . ), which are not shown in the figure.

It is further understood that a trader can consolidate net change values, or any other price derivative, in a similar manner to how price levels are consolidated. Price consolidation is described in U.S. application Ser. No. 09/971,087, filed on Oct. 5, 2001, and entitled, "Click Based Trading with Intuitive Grid Display of Market Depth and Price Consolidation," the contents of which are incorporated herein by reference. When the interface is configured to display market information in relation to a consolidated price scale, the same interface may be configured to display market information in relation to a consolidated price derivative scale. As such, market information like bid and offer quantities may be consolidated and displayed in association with a consolidated price derivative row. Consolidation of the price derivative axis may be activated through a graphical user interface, such as the trading screen itself or through some menu driven interface, for instance.

Figure 9:
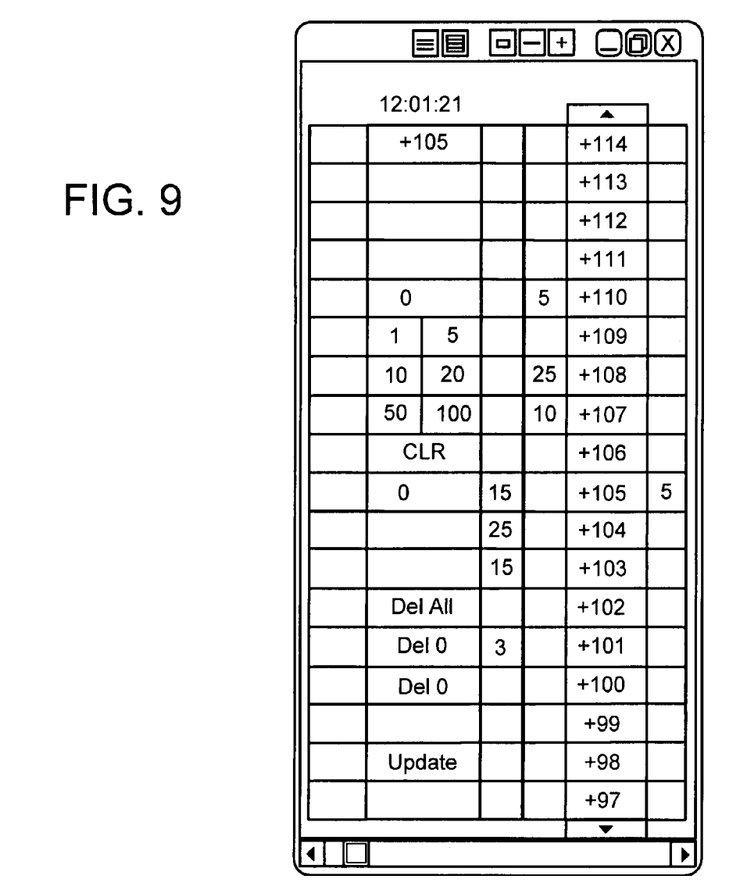

FIG. 9 shows a screen with a value axis according to another embodiment. In this example, the net change is displayed along the value axis without displaying prices as in FIGS. 6, 7, and 8. Again, the net change is "+105" ticks because the last trade of "5" occurred at "230." Accordingly, value axis generator 402 has generated a value axis to display market information in association with net change. As shown, the value axis shows net change values from "+97" to "+114."

A feature of the present invention is its flexibility. For instance, as indicated earlier, net change represents a difference in value between two points in time. The example described with respect to FIGS. 6, 7, 8, and 9 used the previous settlement price. However, other changes could have been tracked just as easily by value axis generator 402. For instance, the change in the best bid price or the change in the best offer price over a certain time period could have been displayed. Accordingly, any change, of any item of interest, may be tracked and displayed on the screen.

Figure 10:
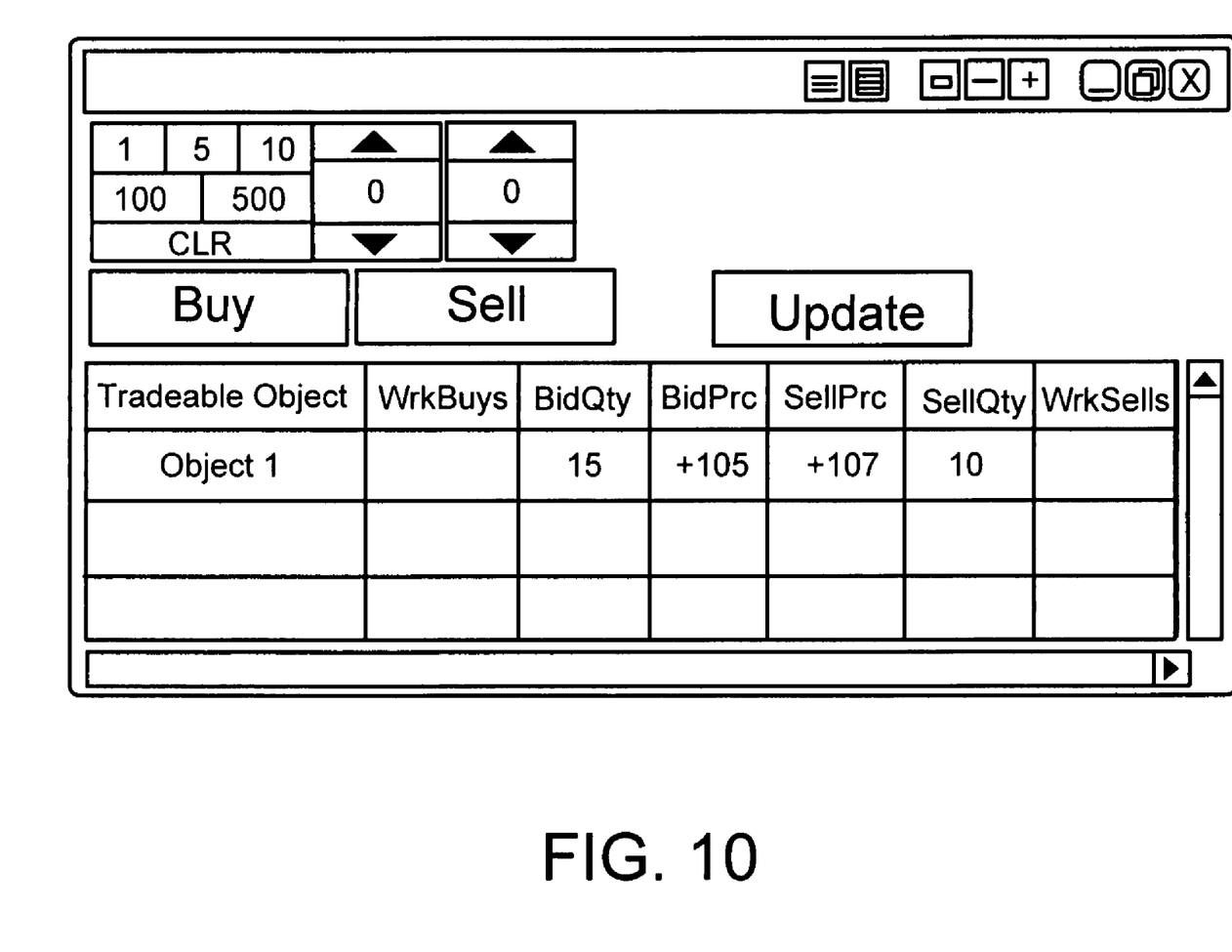
FIG. 10 illustrates an example screen in accordance with another aspect of the preferred embodiments.

As indicated earlier, other types of screens may benefit from the preferred embodiments, besides the trading screens that utilize an axis. FIG. 10 illustrates a screen without an axis. However, as shown, it too can display price derivatives that are generated by value axis generator 402. For ease of illustration, some of the data shown in the screen in FIG. 10 is equivalent to that data shown in FIGS. 8 and 9. In other words, "object 1," which represents an example tradeable object, has a current bid quantity of "15" available at the net change value of "+105," and has a current offer quantity of "10" available at the net change value of "107."

In addition, multiple scales may be used along an axis such that each scale represents a different value type. For instance, one scale might represent price and a second scale might represent a derivative of price such as shown in FIGS. 6, 7, and 8. In another instance, one scale might represent one type of derivative of price and a second scale might represent another type of derivative of price. Of course, one of ordinary skill in the art will appreciate that any number of scales and/or axes may be used in conveying information to the trader.

B. Order Entry

In one embodiment, a trading screen may be programmed to accept signals indicating a desire to send buy or sell orders to the exchange. For instance, a trader may be able to send orders by simply clicking in designated regions, such as in buy and/or sell order entry regions, of the display. Likewise, orders could be easily cancelled with the click of a mouse. As such, the preferred embodiments build on the order entry and order cancellation concepts described in the incorporated U.S. patent application Ser. No. 09/590,692, entitled, "Click Based Trading With Intuitive Grid Display of Market Depth."

According to one aspect of the preferred embodiments, to enable a trader to quickly send an order to electronic exchange, one or more parameters of an order are preferably based on at least one preset parameter and the location of a cursor on the display. According to one preferred embodiment, an order's quantity is based on a preset quantity while the order's price is based on the location of the cursor on the display, regardless of whether price is actually being displayed with the price derivative. Of course, the preset parameter can be based on something other than quantity such as last traded quantity ("LTQ"), a theoretical value, price, or some other item of interest. Additionally, the preset parameter may be linked to and/or based on a dynamic value or an equation.

According to one aspect of the preferred embodiments, the display has one or more regions. Then, the regions can be set up so that one region is an order entry region for buy orders and another region is an order entry region for sell orders. A buy order entry region can be an area dedicated for order entry, or alternatively, the buy order entry region can overlap other regions such as the bid quantity display region. The same may be true for a sell order entry region. Then, when an input device used to control the cursor is positioned over one of the order entry regions, and a button is "pressed" an order to buy (if the cursor is positioned over the buy order entry region) or an order to sell (if the cursor is positioned over the sell order entry region) would be sent to the electronic exchange. It should also be understood that the preferred embodiments may have multiple buy regions and/or multiple sell regions. Then, for example, each of the multiple buy regions and each of the multiple sell regions could represent a different order type. Example order types known to one skilled in the art of trading include basket, iceberg, block orders limit, limit-on-close, limit-on-open, market, market-on-close, market-on-open, odd lot, one-cancels-all, relative stop, stop limit, sweep-to-fill, and volume weighted average price.

According to one aspect of the preferred embodiments, orders can be sent to an electronic exchange by simply clicking in buy and/or sell order entry regions of the display. In other words, orders may be sent by a single-action of a user input device. As used herein, a single-action preferably refers to a single click of a mouse as a means for user input and interaction with the terminal display. While this describes a preferred mode of interaction, the scope of the present invention is not limited to the use of a mouse as the input device or to the click of a mouse button as the user's single-action. Rather, any action by a user within a short period of time, whether comprising one or more clicks of a mouse button or other input device, is considered a single-action of the user for the purposes of the present invention.

For example, referring to FIG. 8, a buy order entry region might include cells 802 on the bid side and a sell order entry region might include cells 804 on the ask side. In particular, with a preset quantity already set, if one clicks on a cell in the buy order entry region, then an order would be sent to the exchange to buy a quantity of the tradeable object equal to the preset quantity. If one clicks on a cell in the sell order entry region, then an order would be sent to the exchange to sell a quantity of the tradeable object equal to the preset quantity.

In another aspect of the preferred embodiments, buttons on an input device are programmed so that when a particular button is pressed it sends a buy order to the matching engine and that when another button when pressed it sends a sell order to the matching engine. For instance, with a present quantity already set, if one clicks on a cell associated with a price with the right mouse button, then an order would be sent to the exchange to sell a quantity of the tradeable object equal to the preset quantity. If one clicks on a cell associated with a price with the left mouse button, then an order would be sent to the exchange to buy a quantity of the tradeable object equal to the preset quantity.

IV. Other Price Derivative Examples

As indicated previously, any price derivative can be used so long as there is some relationship between a price and the price derivative, such as a formula. Examples include yield, P/L, volatility, and momentum. If the price derivative values are actually displayed on the screen, they may be displayed to the trader in any form including a numerical format and/or a graphical format. It is understood that the following examples are considered as illustrative only, and that one skilled in the art can apply the principles described in this application to any values on an axis.

In one embodiment, yield is a derivative of price. There are many types of yield, though a commonly referred to yield is the yield to maturity (YTM), which is the interest rate by which the present values of all the future cash flows are equal to the bond's price. The YTM for U.S. Treasury bonds and notes can be determined by solving the following equation:

$$\text{Price} = \frac{C\left[1 - \left[\frac{1}{(1+y_{TM})^T}\right]\right]}{y_{TM}} + \frac{P}{(1+y_{TM})^T}$$

Where:
Price=Price value
C=the rate of interest to be paid
P=Principal, which is the amount to be borrowed (e.g., face value or par)
T=Term
$Y_{TM}$=YTM Using the yield equation, for instance, value axis generator can generate yield values on a value axis for which market information is appropriately mapped. To do so, various inputs into value axis generator might include the variables (fixed variables or non-fixed variables) shown in the equation above. Then, value axis generator can solve or back solve for the unknown variable, such YTM in this instance. Accordingly, the trading display having market data mapped to yield gives traders an opportunity to trade based on yield.

In another embodiment, profit & loss or P&L is a derivative of price. There are many ways to measure P&L, all of which may be mapped to an axis. For instance, the break-even point may be used. So, if a trader has bought one lot of a particular tradeable object at "230," then referring to FIG. 8, the value axis might include a "0" associated the price of "230," and then "+1" associated with "231," "+2" associated with "232," and so on, and "−1" associated with "229," "−2" associated with "228," and so on. In this instance, these P&L values represent the gross profit acquired if one lot of the particular tradeable object was sold at the associated price. Of course, there are numerous ways to calculate P&L and one of ordinary skill in the art would recognize the many different possibilities. In addition, it will be appreciated by one of skill in the art that graphics may be used to display P&L (or any other price derivative indicator, for that matter) along the value axis instead of or in addition to using numerical values. For instance, if the trader's P&L is positive, a color such as green might be displayed at such positive value locations whereas if the trader's P&L is negative, a color such as red might be displayed at negative value locations.

In yet another embodiment, volatility, and in particular, implied volatility is a derivative of price. In one embodiment, implied volatility is a theoretical value (or values) designed to represent the volatility of the tradeable object underlying an option as determined by the price of the option. There are many ways to measure volatility, all of which may be mapped to an axis. A common formula used in measuring volatility is the Black-Scholes option pricing model, a version of which is shown below:

$$C = SN(d_1)Ke^{(-rt)}N(d_2)$$

Where:
C=Theoretical call premium
S=Current stock price
t=Time until option expiration
K=Option striking price
r=risk free interest rate
N=Cumulative standard normal distribution
e=exponential term (2.7183)

$$d_1 = \frac{\ln(S/K) + (r + s^2/2)t}{s\sqrt{t}}$$

$d_2 = d_1 - s\sqrt{t}$
s=standard deviation of stock returns
ln=natural logarithm Using the Black-Scholes equation, for instance, value axis generator can generate volatility values on a value axis for which market information is appropriately mapped. Then, the trading display gives traders an opportunity to trade based on volatility. Of course, many different equations can used to generate volatility values.

Momentum is a type of trading strategy used by some traders. In momentum trading, traders may focus on a tradeable objects movement over the course of a defined time period. In other words, momentum is the perceived strength behind a price movement. As such, momentum indicators may be displayed along an axis. Such indicators attempt to predict future market trends based on recent price and volume data. For instance, an indicator might compare the current price of a tradeable object to the price a selected number of periods ago. The resulting number represents the rate of change of the security's price over that given time period. According to this embodiment, values on the axis might change in magnitude to correspond to changes in momentum at a particular price level.

V. Conclusion

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

It is further understood that the programs, processes, methods and apparatus described herein are not related or limited to any particular type of computer or network apparatus (hardware or software), unless indicated otherwise. Various types of general purpose or specialized computer apparatus or computing device may be used with or perform operations in accordance with the teachings described herein.

It is further understood that a hardware embodiment might take a variety of different forms. A hardware embodiment may be implemented as an integrated circuit with custom gate arrays or an application specific integrated circuit ("ASIC"). A hardware embodiment may also be implemented with discrete hardware components and circuitry. In particular, it is understood that the logic structures and method steps described in the flow diagrams may be implemented in dedicated hardware such as an ASIC, or as program instructions carried out by a microprocessor or other computing device.

The claims should not be read as limited to the described order of elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

What is claimed is:

1. A method for displaying market information on a graphical user interface, the method comprising:
   receiving by a computing device a current highest bid price and a current lowest ask price for a tradeable object from an electronic exchange;
   identifying by the computing device a long or short position taken by a user with respect to the tradeable object, wherein the long position is associated with a quantity of the tradeable object that has been bought by the user at a price, and wherein the short position is associated with a quantity of the tradeable object that has been sold by the user at a price;
   computing by the computing device a plurality of values based on the long or short position, wherein each of the plurality of values represents a profit or loss if the long or short position is closed at a price level among a range of price levels for the tradeable object;
   displaying via the computing device the plurality of values along a value axis;
   displaying via the computing device a first indicator at a first location corresponding to a first value along the value axis, wherein the first indicator represents a particular price based on any of the following prices: current best bid, current best ask, and a last traded price, and wherein the first value represents a profit or loss incurred by the user if the long or short position is closed at the particular price; and
   moving the first indicator relative to the value axis to a second location corresponding to a second value along the value axis responsive to receipt of an update to the particular price, wherein the second value represents a profit or loss incurred by the user if the position is closed at the update to the particular price.

2. The method of claim 1, further comprising an order entry region in alignment with the value axis, the order entry region comprising a plurality of locations for receiving commands to send orders, each location corresponding to a value along the value axis.

3. The method of claim 2, further comprising:
   in response to a selection of a location of the order entry region by a single action of a user input device, setting an order price based on the selected location.

4. The method of claim 1, further comprising displaying the range of price levels along the value axis, wherein each price level of the range of price levels corresponds to a different value along the value axis.

5. The method of claim 1, further comprising graphically indicating on the value axis whether a particular value of the plurality of values represents a profit or a loss.

6. The method of claim 1, wherein each of the plurality of values comprises a number to indicate a profit or loss.

7. The method of claim 1, wherein each of the plurality of values comprises a plus or minus sign to indicate a profit or loss.

8. The method of claim 1, wherein the user represents a single trader.

9. The method of claim 1, further comprising receiving a re-positioning command.

10. The method of claim 1, further comprising:
    identifying a new long or short position taken by the user with respect to the tradeable object, wherein the new long or short position is associated with a second quantity of the tradeable object that has been bought or sold by the user at a second price;
    computing a second plurality of values based on the new long or short position, wherein each of the second plurality of values represents a profit or loss if the new long or short position is closed at a price level among the range of price levels; and
    displaying via a computing device the second plurality of values along a value axis.

11. The method of claim 1, further comprising:
    displaying via the computing device a second indicator at a third location corresponding to a third value along the value axis, wherein the second indicator represents a second particular price based on any of the following prices: current best bid, current best ask, and the last traded price, wherein the third value represents a profit or loss incurred by the user if the position is closed at the second particular price, and wherein the second particular price of the second indicator is different than the price of the first indicator; and
    moving the second indicator relative to the value axis to a fourth location corresponding to a fourth value along the value axis responsive to receipt of an update to the second price, wherein the fourth value represents a profit or loss incurred by the user if the position is closed at the update to the second price.

12. A computer readable medium having program code recorded thereon for execution on a computer, the program code causing a machine to perform the method comprising:
    receiving a current highest bid price and a current lowest ask price for a tradeable object from an electronic exchange;
    identifying a long or short position taken by a user with respect to the tradeable object, wherein the long position is associated with a quantity of the tradeable object that has been bought by the user at a price, and wherein the short position is associated with a quantity of the tradeable object that has been sold by the user at a price;
    computing a plurality of values based on the long or short position, wherein each of the plurality of values represents a profit or loss if the long or short position is closed at a price level among a range of price levels for the tradeable object;
    displaying via a computing device the plurality of values along a value axis; displaying via the computing device a first indicator at a first location corresponding to a first value along the value axis, wherein the first indicator represents a particular price based on any of the following prices: current best bid, current best ask, and a last traded price, and wherein the first value represents a profit or loss incurred by the user if the long or short position is closed at the particular price; and moving the first indicator relative to the value axis to a second location corresponding to a second value along the value axis responsive to receipt of an update to the price, wherein the second value represents a profit or loss incurred by the user if the position is closed at the update to the particular price.

13. The computer readable medium of claim 12, further comprising an order entry region in alignment with the value axis, the order entry region comprising a plurality of locations for receiving commands to send orders, each location corresponding to a value along the value axis.

14. The computer readable medium of claim 13, further comprising: in response to a selection of a location of the order entry region by a single action of a user input device, setting an order price based on the selected location.

15. The computer readable medium of claim 12, further comprising displaying the range of price levels along the value axis, wherein each price level of the range of price levels corresponds to a different value along the value axis.

16. The computer readable medium of claim 12, further comprising graphically indicating on the value axis whether a particular value of the plurality of values represents a profit or a loss.

17. The computer readable medium of claim 12, wherein each of the plurality of values comprises a number to indicate a profit or loss.

18. The computer readable medium of claim 12, wherein each of the plurality of values comprises a plus or minus sign to indicate a profit or loss.

19. The computer readable medium of claim 12, wherein the user represents a single trader.

20. The computer readable medium of claim 12, further comprising receiving a re-positioning command.

21. The computer readable medium of claim 12, further comprising:

identifying a new long or short position taken by the user with respect to the tradeable object, wherein the new long or short position is associated with a second quantity of the tradeable object that has been bought or sold by the user at a second price;

computing a second plurality of values based on the new long or short position, wherein each of the second plurality of values represents a profit or loss if the new long or short position is closed at a price level among the range of price levels; and displaying via a computing device the second plurality of values along a value axis.

22. The computer readable medium of claim 12, further comprising:

displaying via the computing device a second indicator at a third location corresponding to a third value along the value axis, wherein the second indicator represents a second particular price based on any of the following prices: current best bid, current best ask, and the last traded price, wherein the third value represents a profit or loss incurred by the user if the position is closed at the second particular price, and wherein the second particular price of the second indicator is different than the price of the first indicator; and moving the second indicator relative to the value axis to a fourth location corresponding to a fourth value along the value axis responsive to receipt of an update to the second price, wherein the fourth value represents a profit or loss incurred by the user if the position is closed at the update to the second price.

\* \* \* \* \*